(12) United States Patent
Sakai et al.

(10) Patent No.: US 7,505,504 B2
(45) Date of Patent: Mar. 17, 2009

(54) LASER PROCESSING DEVICE

(75) Inventors: Hirotaka Sakai, Miyoshi (JP); Tetsuya Watabe, Miyoshi (JP); Hidenori Nakano, Miyoshi (JP)

(73) Assignee: Sango Co., Ltd., Aichi (JP)

( * ) Notice: Subject to any disclaimer, the term of this patent is extended or adjusted under 35 U.S.C. 154(b) by 12 days.

(21) Appl. No.: 11/576,792

(22) PCT Filed: Oct. 6, 2005

(86) PCT No.: PCT/JP2005/018563

§ 371 (c)(1),
(2), (4) Date: Apr. 5, 2007

(87) PCT Pub. No.: WO2006/038678

PCT Pub. Date: Apr. 13, 2006

(65) Prior Publication Data

US 2008/0031298 A1    Feb. 7, 2008

(30) Foreign Application Priority Data

Oct. 7, 2004    (JP)    ............... 2004-294938

(51) Int. Cl.
*H01S 3/22*    (2006.01)
(52) U.S. Cl. .............. 372/55; 372/56; 372/60
(58) Field of Classification Search ........... 372/55, 372/59, 60
See application file for complete search history.

(56) References Cited

U.S. PATENT DOCUMENTS 5,354,964 A    10/1994    Kyoren et al.

FOREIGN PATENT DOCUMENTS

| JP | 63-264291 | * 11/1988 |
| JP | 1989114189 | 8/1989 |
| JP | 3110094 | 5/1991 |
| JP | 06079489 | 3/1994 |
| JP | 06122089 | 5/1994 |
| JP | 7503904 | 4/1995 |
| JP | 2514138 | 4/1996 |
| JP | 11788 | 1/1999 |
| JP | 1158048 | 3/1999 |

(Continued)

OTHER PUBLICATIONS

PCT International Search Report dated Dec. 13, 2005.

*Primary Examiner*—Dung T Nguyen
(74) *Attorney, Agent, or Firm*—Dickinson Wright, PLLC

(57) ABSTRACT

A laser processing device in which even a short nozzle provided with a follower roller (35) can prevent disturbance of a laser beam and contamination of protective glass and in which shield gas can act effectively. The laser processing device comprises a head section (11) from which a laser beam that is condensed by a condenser lens (16) provided inside the device is irradiated through a nozzle section (13); a gas delivery means (28) opened in a processing direction X, in the vicinity of the focal point of laser beam, and jetting a shield gas from the opening; a primary air delivery means (31) directed in the processing direction X, above the focal point F of the laser beam, and jetting primary air A1 substantially in the horizontal direction to form a first air curtain; and secondary air delivery means (18, 13, 19) directed to the focal point from the vicinity of the condenser lens and jetting secondary air A2 to form a second air curtain.

12 Claims, 7 Drawing Sheets

FOREIGN PATENT DOCUMENTS

| | | |
|---|---|---|
| JP | 11216589 | 8/1999 |
| JP | 11-216589 * | 10/1999 |
| JP | 2000263276 | 9/2000 |
| JP | 3312896 | 5/2002 |
| JP | 3482452 | 10/2003 |
| WO | 93 016838 | 9/1993 |

* cited by examiner

LASER PROCESSING DEVICE

TECHNICAL FIELD

The present invention relates to a laser processing device.

BACKGROUND ART

In a conventional laser welding practice, a tapered nozzle (hereinafter referred to as a long nozzle) covers a region from the lenses to the close vicinity of the focal point, to protect the laser beam from a disturbance such as smoke (fume or plasma plume), sputters (scattered molten powder) or the like (hereinafter referred to as floating matters) until the laser beam reaches the focal point (the weld of the work) or to prevent floating matters from sticking to the condenser lens in the upper part or the protective glass underneath it. It is also known that shield gas, indispensable for welding, is jetted from a guiding channel disposed in the long nozzle in combination with it (see Patent Document 1).

Furthermore, while it is necessary in laser welding to position the focal point of the laser beam on the surface of the work (or somewhat within the work) with high precision, it is difficult to keep the focal distance constant while moving the beam in the welding direction, especially so where the weld is not flat. To address this problem, it is also known to provide a roller in a position orthogonal to the proceeding direction of welding relative to the focal part of the laser beam and forcibly keep the focal distance with the roller following along the surface of the work (see Patent Documents 1, 2 and 3).

Also, it is an extensively adopted practice to arrange the guiding channel and jetting outlet (hereinafter referred to as a side nozzle) of shield gas so as to extend very closer to the focal point independently of the main nozzle with the aim of preventing shield gas from flowing in too large a volume and from diffusing.

Since this method inevitably entails an arrangement in which the length of the main nozzle is kept short to avoid interference with the side nozzle and the side nozzle is positioned between the focal point and the short main nozzle, the shielding effect of the long nozzle against floating matters cannot be expected, making the disturbance of the laser beam and the contamination of the protective glass unavoidable.

Known techniques to address this problem include providing another air jetting outlet between the short nozzle and the shield gas jetting outlet and jetting out a substantially horizontal air curtain from there to prevent floating matters from shifting upward (being blown up) (see Patent Documents 4 and 5).

Still other known techniques include the addition of a large duct, slit passage of air (lamination of the air flow) and focusing of inert gas to the focal point (downward orientation) for strengthening the air curtain effect (see Patent Document 6).

Patent Document 1: JP-A-3-110094
Patent Document 2: JP-B2-3312896
Patent Document 3: JP-B2-3482452
Patent Document 4: JP-A-6-122089
Patent Document 5: JP-A-2000-263276
Patent Document 6: JP-A-6-79489

DISCLOSURE OF THE INVENTION

Problem to be Solved by the Invention

If the following roller disclosed in Patent Document 2 or 3 is installed beside the long nozzle in a direction orthogonal to the proceeding direction of welding described in Patent Document 1 cited above, there will arise a problem that the desire to bring the contact between the roller and the work as close as possible to the focal point poses an obstacle to increasing the nozzle diameter.

Furthermore, since high power laser welding has come to be required nowadays, and this requirement necessitates increasing the lens diameter and reducing the focal distance, the long nozzle inevitably has to be made larger in overall size and in diameter. Therefore, it is difficult to combine Patent Documents 1 and 2 or 3 and equip the long nozzle with the roller. Moreover, the additional installation of the shield gas guiding channel within the long nozzle makes it even more difficult.

A shield gas guiding channel additionally installed in the long nozzle is inherently susceptible to insufficiency in flow rate, but expanding the sectional area of the guiding path would entail an increase in long nozzle size, and this as well as the above is incompatible with the pursuit of greater output.

However, if the space for the roller is secured by removing part of the long nozzle unit to make it a short nozzle, it will become impossible to avoid the problems of the disturbance to the laser beam and the contamination of the protective glass. There has been a call for a laser welding apparatus which, even if its short nozzle is equipped with a following roller, is free from the disturbance to the laser beam and the contamination of the protective glass.

Or, in a configuration in which another air jetting outlet is disposed between the short nozzle and the shield gas jetting outlet and an air curtain is jetted out from it substantially horizontally, as described in Patent Document 4 or 5 cited above, though it is effective in preventing floating matters in the air curtain area from being blown up, the configuration not only is unable to prevent floating matters outside the area from being blown up, but also positively causes part of the floating matters to shift upward by rolling in the air flow, resulting in failure to solve the problems of the disturbance to the laser beam and the contamination of the protective glass.

Patent Document 6 cited above also leaves the problem of rolling-in unsolved, failing to completely obstruct floating matters from shifting upward. Besides that, the downward jetting of a powerful air curtain gives rise to a new problem of rolling in even the all-important shield gas and diffusing it.

On account of these circumstances, there is a keen call for a laser processing apparatus which, even if it is equipped with the following roller and has a short nozzle, can securely prevent the disturbance to the laser beam and the contamination of the protective glass and enables shield gas to function effectively.

Now, an object of the present invention is to provide a laser processing device which can meet this call.

BRIEF SUMMARY OF THE INVENTION

Means for Solving the Problem

In order to achieve the object stated above, according to a first aspect of the invention, a laser processing device is characterized in that there are provided a head section wherein a laser beam condensed by a built-in condenser lens is radiated through a nozzle section; gas delivery means which opens oriented in the progressing direction of processing in the vicinity of the focal point of the laser beam and jets out shield gas from the opening; primary air delivery means which is oriented in the progressing direction of processing above the focal point of the laser beam and forms a first air curtain by jetting out primary air in a substantially horizontal direction; and secondary air delivery means which is oriented in the focusing direction from the vicinity of the condenser lens and forms a second air curtain by jetting out secondary air.

According to a second aspect of the invention, in the first aspect of the invention, the primary air delivery means has slit-shaped outlets and a covering member which surrounds the primary air flow and permits the passage of a laser beam, and the secondary air delivery means is so configured as to jet out the secondary air from around the condenser lens into the nozzle.

According to a third aspect of the invention, in the first or second aspect of the invention, the flow rate of the primary air is set greater than the flow rate of the secondary air when processing is to take place.

According to a fourth aspect of the invention, in the first, second or third aspect of the invention, a following roller rotatably pivots on a supporting arm extending from the head section, and the head section is displaced following the following roller.

According to a fifth aspect of the invention, in the fourth aspect of the invention, wiper members are further provided to reject sticking matters on side faces of the following roller.

EFFECTS OF THE INVENTION

According to the first aspect, floating matters blown up from the laser processing section are rejected in the progressing direction of processing with the flow of the primary air curtain formed of the primary air, and the floating matters can be further prevented from being blown up toward the condenser lens by the flow of the secondary air curtain formed of the secondary air. Moreover, the mutually reinforcing effect of the primary air curtain of the primary air and the secondary air curtain of the secondary air strengthens the rejection of the floating matters in the progressing direction of processing.

Therefore, it is possible to provide a laser processing device which, in spite of its short nozzle, can firmly prevent external disturbance of the laser beam and contamination of the protective glass and enables shield gas to function effectively.

According to the second aspect, since the primary air flows within the cover member, the primary air curtain of that primary air is formed satisfactorily, the rejection of the floating matters is accomplished satisfactorily, and the secondary air curtain of the secondary air is so formed as to surround the outer periphery of the laser beam, whereby preventing the floating matters from invading into the laser beam area. Therefore, the external disturbance of the laser beam and the contamination of the protective glass can be prevented even more effectively.

According to the third aspect, it is possible to further enhance the mutually reinforcing effect of the primary air and the secondary air by setting the flow rate of the primary air greater than the flow rate of the secondary air.

As the fourth aspect, in the case of providing the following roller, it is possible to provide a laser processing device which can achieve the effect of keeping the focal point of the laser beam matched with the processing position by that following roller and is free from external disturbance of the laser beam and contamination of the protective glass in spite of its short nozzle.

According to the fifth aspect, it is possible to further prevent sputters or the like from sticking to the following roller.

BEST MODE FOR CARRYING OUT THE INVENTION

One of the best modes for carrying out the present invention will be described in detail below with reference to drawings.

FIG. 1 shows an overall view of a laser processing device according to the invention as seen in the progressing direction of processing; FIG. 2, the right side view of the device in FIG. 1; FIG. 3, a plan view of the device in FIG. 1 as seen from above; FIG. 4, a partially exploded side view as seen from the other side of FIG. 2; FIG. 5, a view as seen in the progressing direction of processing in FIG. 4; FIG. 6, a view showing the flows of primary air and secondary air in a further exploded illustration of the essential part in FIG. 4; FIG. 7, a view showing an example of application of the laser processing device according to the invention; and FIG. 8 illustrates the positioning of the direction of indexing the work in FIG. 7.

The laser processing device according to the invention, intended for use in welding a work by laser processing, cutting a work, marking a work or the like, will be described with reference to an embodiment of the invention in which the laser processing device is applied to a welding apparatus. However, this is not meant to limit the invention to these embodiments.

The fitting frame 1 of the present device is provided on the processing machine body, not shown in FIG. 1, to be movable in the vertical direction. The fitting frame 1 is moved up and down by an actuator 70 disposed on a device body 71 as shown in FIG. 7.

The fitting frame 1 is provided with a shaft 2 in the vertical direction as shown in FIG. 1, and the shaft 2 is provided with a supporting member 3 to be movable in the up and down directions. Further, an elastic member 4 consisting of a coil spring intervenes concentrically with the shaft 2 between the upper end face of the supporting member 3 and the upper side part of the frame 1 to give constant downward pressure to the supporting member 3, and the supporting member 3 is enabled to move upward relative to the fitting frame 1 against the pressure of the elastic member 4. Therefore, the supporting member 3 is floatingly supported to be movable in the up and down directions.

A first supporting frame 5 is vertically fastened to the supporting member 3, and a second supporting frame 6 is vertically fastened to the first supporting frame 5. The body part 8 of the laser processing device to be described afterwards is supported by this first supporting frame 5 and a second supporting frame 6. Therefore, the body part 8 of the laser processing device to be described afterwards is floatingly supported to be movable in the up and down directions.

The body part 8 of the laser processing device has a laser irradiating section 10 into which an optical fiber 9 is inserted and a head section 11, and the head section 11 comprises a cylindrical body section 12 and a nozzle section 13.

The cylindrical body section 12 consists of a cylinder body 14 which is open at the top and the bottom as shown in FIG. 4, and the cylinder body 14 has, inserted into it, a cylinder portion 15 having a condenser lens 16 for condensing a laser beam sent from an oscillator (not shown) via the optical fiber 9 and a protective glass 17 for protecting the condenser lens 16 from floating matters generated by welding, both built into the cylinder portion 15.

An annular slit 18, consisting of an annular space, is formed between the cylinder body 14 and the cylinder portion 15. That is, the annular slit 18 is so formed as to surround the exterior of the condenser lens 16 and the protective glass 17. Further, the upper part of the annular slit 18 is blocked, and its lower part is open to communicate with the inside of the nozzle section 13 by way of an annular opening 18a. A secondary air inlet 19 communicates with the annular slit 18. These annular slit 18, the nozzle section 13, the secondary air inlet 19 and the like constitute secondary air delivery means.

Therefore, when secondary air (pressurized air or inert gas) A2 is fed in through the secondary air inlet 19, that secondary air A2 fully permeates the annular slit 18, and then jets out as a cylindrically shaped air curtain from the annular opening 18a in the lower part into a conic section 20 of the nozzle section 13.

The nozzle section 13 is formed of the tapered conic section 20 whose bore shrinks from top toward bottom, and the upper and lower ends of its internal space 21 are open. The upper end of the internal space 21 is formed to have a bore communicating with the annular opening 18a of the annular slit 18. Further, the inner face of the conic section 20 is formed in a taper shape whose diameter shrinks toward the bottom along the external shape of a laser beam L from the condenser lens 16.

The conic section 20 of the nozzle section 13 is so provided as to be linked to or separated from the cylinder body 14 of the cylindrical body section 12 by turning a bolt or a screw clockwise or counterclockwise, and separating it facilitates maintenance of the condenser lens 16 and the protective glass 17.

On a part of the lower end of the conic section 20 in the nozzle section 13, namely on the reverse side to the progressing direction of welding (the progressing direction of processing) X, a support piece 22 formed by extending the conic section 20 downward is provided as shown in FIG. 6, and underneath the conic section 20 there is provided a space section 23, open on the side of the progressing direction of welding X and on both sides in the direction orthogonal to that direction.

A bracket 24 is fastened to the support piece 22 in a direction reverse to the progressing direction of welding X and on a side of the support piece 22 as shown in FIG. 4, and the bracket 24 extends downward from the support piece 22. In the bracket 24, a long hole 25 is formed which opens in the direction orthogonal to the progressing direction of welding X and is long in the up and down directions. On the side of the bracket 24 where the laser beam L passes, a holding member 26 is arranged in such a position that the holding member does not obstruct the passage of the laser beam L. The holding member 26 is provided by a screw 27 inserted into the long hole 25.

A side nozzle 28 constituting gas delivery means is inserted into and fastened to the holding member 26, with a jetting outlet at its lower end oriented in the progressing direction of welding X and toward the vicinity of the focal point F of the laser beam L. By loosening the screw 27, the side nozzle 28 can be turned together with the holding member 26 around the screw 27 to control the variation of its angle (posture) toward the welding face WL, and by tightening the screw 27, the controlled position (posture) can be held. In FIG. 4, an angle α between the side nozzle 28 indicated by a solid line and the side nozzle 28 indicated by a chain line represents the controllable range; in both cases, the jetting outlet at the lower end of the side nozzle 28 can be oriented toward the vicinity of the focal point F of the laser beam.

A shield gas inlet 29 is connected to the upper end of the side nozzle 28, and shield gas G let in through the shield gas inlet 29 is jetted from a jetting outlet at the lower end through the side nozzle 28 to the vicinity of the focal point F. Thus, the shield gas is present all the time in the vicinity of the focal point F and constitutes an atmosphere to shield the weld.

A covering member 30 is fastened, positioned on the inner face of the bracket 24 in the progressing direction of welding X and on an upper side of the side nozzle 28. The covering member 30 is formed in a box shape lacking a wall only on the progressing direction of welding X, as shown in FIG. 6, and has a full opening 30a on a side in the progressing direction of welding X. Further, as shown in FIG. 6, a laser beam passing hole 30c is bored into the upper wall 30b of the covering member 30, and another laser beam passing hole 30e is bored into the lower wall 30d. Further, on the rear wall 30f reverse to the progressing direction of welding X, two substantially horizontal slit-shaped outlets 31, penetrating the wall in the back and forth directions, are formed in upper and lower positions.

Further, a chamber 32 is disposed behind the rear wall 30f of the covering member 30, and the chamber 32 and the slit-shaped jetting outlets 31 communicate with each other. Further, a primary air inlet 33 is connected to the chamber 32. Primary air A1 that is supplied is jetted out from the two slit-shaped jetting outlets 31 through the chamber 32, circulates in a substantially horizontal air curtain form within the covering member 30, and is jetted out in the progressing direction of welding X from the opening 30a.

Incidentally, the primary air curtain of primary air A1 jetted out of the covering member 30 and the slit-shaped jetting outlets 31 need not be horizontal relative to the progressing direction of welding X in every case, but can be inclined upward or downward as required. However, if it is excessively inclined, the air curtain may roll in and diffuse shield gas G, and therefore its inclination, if any, should be kept within the extent of not rolling in shield gas G.

Primary air delivery means is configured of the slit-shaped jetting outlets 31 and other elements.

On a side of the cylindrical body section 12, a supporting arm 34 is firmly fitted as shown in FIG. 1 and FIG. 5, and the supporting arm 34 hangs down as far as to a position underneath the covering member 30.

A following roller 35 and wiper members 36 are attached to the lower end of the supporting arm 34. The following roller 35 is attached with an allowance for idling to a rotation shaft 37 provided on the supporting arm 34 in a horizontal direction orthogonal to the progressing direction of welding X. Further, the following roller 35 is formed of a disk and arranged in a space between the covering member 30 and the focal point F of the laser beam, and has a diameter as large as possible to serve as a side wall in the space between the focal point F and the covering member 30 for preventing diffusion of floating matters.

It is desirable for the position of the following roller 35 in the direction orthogonal to the progressing direction of welding X (the position in FIG. 5) to be disposed such that the following position of the following roller 35 (the position in which it is contact with the work) is as close as practicable to the focal position of the laser beam, and for the position of the following roller 35 in the progressing direction of welding X (the position in the right and left direction in FIG. 4) to be disposed such that the following position (the position of contact with the work) B of that following roller 35 is the same as the focal point F of the laser beam. The position in the height direction is not always the same, varying with the focal depth of the laser beam relative to the work and other factors.

Two wiper members 36 are disposed in a substantial V shape, fixed to the lower end of the supporting arm 34. These wiper members 36 are arranged in parallel with slight gaps from a face of the following roller 35 on a side of welding, and immediately scrape off sputters sticking to the face of the following roller 35 on the side of welding in collaboration with the rotation of the following roller 35. The number and shape of these wiper members 36 can be selected as desired.

The shield gas (assist gas) may consist of argon, helium gas, nitrogen gas or a mixture of any of them as appropriate.

As the primary air A1 and secondary air A2, the shield gas may as well be used.

Further, the laser oscillator may be either a $CO_2$ laser or a YAG laser, and the laser welding may be so-called hybrid welding combining laser welding with arc welding, or may involve combined use of a welding wire in combination with these techniques.

Next, the actions that take place in welding will be described.

First, before the start of welding, the fitting frame 1 is brought down with an actuator 70 shown in FIG. 7 and, after the following roller 35 comes into contact with the work, is brought farther down to a position where the elastic member 4 shrinks by a certain quantity (e.g. 5 to 10 mm). This makes possible floating support during the welding while restraining with the pressing force of the elastic member 4 the up and down movements of the body part 8 ensuing from the up and down movements of the following roller 35.

When the fitting frame 1 of the laser processing device moves in the progressing direction of welding X relative to the work, the body part 8 supported by the fitting frame 1 also moves in the progressing direction of welding X.

This movement subjects the lower end of the following roller 35 to a force in the up and down directions following the upper face (welded face WL) of the work. This force is transmitted to the head section 11 via the supporting arm 34 and the body of the cylinder 14, and causes the supporting frames 5 and 6 floatingly supported by the fitting frame 1 to move up and down. Thus, the following roller 35 and the whole body part 8 move up and down to the same extent. Therefore, the condenser lens 16 built into the body of the cylinder 14, follows the up and down movements of the following roller 35, and moves up and down to the same extent, and the focal point F of the laser beam is always on the prescribed position of the work irrespective of the shape of the work.

Then, laser welding is accomplished by irradiating the weld of the work with the laser beam.

Next, the conditions of the shield gas and the air curtain in the welding state will be described with reference to FIG. 6.

During the welding process, the shield gas G supplied from the shield gas inlet 29 is jetted out as indicated by an arrow H onto the vicinity of the focal point F of the laser beam via the side nozzle 28, and performs the role of keeping the welding process stable.

The primary air A1 supplied from the primary air inlet 33 flows into a chamber 32, then horizontally jets out into the covering member 30 from the two slit-shaped jetting outlets 31 formed in the covering member 30, and continues to jet out in the progressing direction of welding X, forming two upper and lower layers within the covering member 30 as indicated by arrows I and expanding laterally in each layer. These jet flows of the primary air A1 prevents floating matters generated from the vicinity of the focal point F of the laser beam L (welded portion) from being blown up.

However, such a primary air curtain alone, formed of the primary air A1 in the horizontal direction, is not enough; part of the floating matters may avert the primary air curtain or be blown up, rolled in by the counter flows of the primary air curtain to reach the space section 23 above the covering member 30, and the floating matters may stick to the protective glass 17.

In view of this problem, according to the invention, a secondary air curtain consisting of the secondary air A2 is generated as a further precaution.

Thus, when the secondary air A2 is supplied from the secondary air inlet 19, that secondary air A2 is introduced into the annular slit 18 in the body of the cylinder 14 and jetted out downward from the annular opening 18a of that annular slit 18. This jetted secondary air A2 hangs down as an air curtain in a tapered cylindrical shape covering (shielding) the luminous flux of the laser beam L from the outside, as indicated by arrow J in FIG. 6, and reaches the space section 23 above the covering member 30.

In such a state in which the secondary air A2 is flowing down in a cylindrical air curtain shape, even if there are floating matters rolled up beyond the covering member 30, the flow of the secondary air curtain of the secondary air A2 will prevent the floating matters from invading into the air curtain, which will have a shielding effect. Therefore, floating matters cannot reach the protective glass 17.

Having completed this role to prevent floating matters from being blown up, the air curtain having reached the vicinity of the area above the covering member 30 disappears, and that secondary air A2 is rolled in by the power air curtain flow of the primary air A1 and forcibly turned and rejected toward the progressing direction of welding X, thereby to prevent the secondary air A2 from staying above the covering member 30.

Thus, if the secondary air A2 stayed above the covering member 30, its momentum as the secondary air curtain formed of secondary air would be weakened to make the shielding effect be lost, and the succeeding secondary air curtain would not be formed in a satisfactory way, but the prompt rejection of the secondary air A2 in the progressing direction of welding X as described above eliminates this problem.

Furthermore, as stated above, the secondary air joining with the primary air curtain and flowing in the same direction (the progressing direction of welding X) results in substantial expansion of the primary air curtain of the primary air A1, which strengthens the effect of preventing floating matters from being rolled into the area above the covering member 30 from the lower part of the primary air curtain.

Therefore, according to the invention, not only the individual shielding effects by the relative air curtains of the primary air A1 and of the secondary air A2 but also the mutually reinforcing effect of the primary air A1 and the secondary air A2 can be expected, and this mutually reinforcing effect can almost completely prevent floating matters from sticking to the protective glass 17.

Incidentally, it is desirable for the flow rate of the primary air A1 to be greater than the flow rate of the secondary air A2, and a satisfactory result was obtained when the flow rate ratio between the primary air A1 and the secondary air A2 was about 4:1, though the optimal ratio may differ with given conditions.

Further, as the laser beam passing hole 30c is bored into the upper part of the covering member 30, part of the secondary air A2 flows into the covering member 30 from this laser beam passing hole 30c, and the secondary air A2 joins with the primary air curtain to flow in the progressing direction of welding X. Therefore, the secondary air flowing downward through the laser beam passing hole 30c counters the flow of floating matters otherwise blown up through the upper and lower laser beam passing holes 30c and 30e of the covering member 30, resulting in an enhanced shielding effect against the floating matters.

Thanks to these actions, the use of this embodiment of the invention has provided a result that the required cleaning frequency of the protective glass, which was previously once every hour, has been reduced once a day, namely no more than the usual frequency of routine daily inspection.

After the completion of the laser welding described above, the fitting frame 1 is raised and returned to its original position with an actuator (not shown).

Although the configuration of the following device in this embodiment is such that the following roller 35 is brought into contact with the work and the head section 11 and other elements are raised or lowered, the following device may as well be a non-contact type comprising a displacement sensor which detects the gap between the tip of the head section and the work without making contact and control means which keeps the gap constant in response to the value detected by this displacement sensor, as described in JP-B2-2514138.

This embodiment in which the axis of the cylindrical secondary air curtain of the secondary air A2 hangs down past the center of the laser beam passing hole 30c on the upper face of the horizontal covering member 30 to make the secondary air A2 coaxial with the laser beam L is the most suitable, but the secondary air A2 may as well be jetted out in the following manner.

Although it is desirable for the air curtain of the secondary air A2 to be coaxial with the laser beam L as in the embodiment described above, if coaxial arrangement is impossible structurally or for any other reason, the secondary air A2 may be jetted downward in a state of surrounding the condenser lens 16 and the protective glass 17 insofar as practicable, or jetted downward from the vicinity of the condenser lens 16 and the protective glass 17 or jetted out farther downward from these two elements. In one of these ways, the similar actions and effects to the foregoing can be achieved.

Or, where it is impossible structurally or for any other reason to have the secondary air A2 descend vertically downward, it may have some angle, but the angle should be set within a range in which the secondary curtain of the secondary air A2 and the primary air curtain of the primary air A1 can smoothly join each other. In this way, the similar actions and effects to the foregoing can be achieved.

The progressing direction of welding X means not only the direction in which this laser processing device is progressing (moving) when the work is at halt, but also includes the direction in which welding progresses when this laser processing device is at halt and the work is moving in the direction relatively reverse to that of the laser processing device, and further the direction in which welding progresses when both the laser processing device and the work are moving in the directions relatively reverse to each other. Thus, it means the progressing direction of welding in the relative moving directions of the laser processing device and of the work.

Therefore, the invention can also be applied to a case in which arcuate portions are welded as the focal position of this laser processing device moves in the progressing direction of welding while matching the arcuate portions to be welded wherein the cylindrical work is turned while the laser processing device is kept fixed. An embodiment in this case will be described with reference to FIG. 7 and FIG. 8.

The work to be used in this embodiment is a work W, which is formed in an advance process as a vessel by firmly fitting together, with no fitting gap, one metallic structure W1 formed in a bowl shape and another metallic structure W2 formed also in a bowl shape.

First, the work W placed in a position not shown is held with a clamp section 51 provided at the tip of a robot arm 50 and carried to the laser processing device.

This clamp section 51 is coupled with a tool holding shaft 52 rotatably equipped on a rotation axis 50a provided at the tip of the robot arm 50 and, by being turned by rotation driving means built into the robot arm 50 itself, the tool holding shaft 52 turns in one direction (the direction indicated by arrow K) to turn the clamp section 51 in the circumferential direction, and that turning position is fixed by a random indexing device 53.

In the embodiment shown in FIG. 7, the work W is a muffler for automotive use and, as shown in FIG. 8, an inlet pipe and an outlet pipe 54 protrude by a few mm from both end faces of that muffler. Thus, this protruding section 54a is utilized as the member for positioning the indexing direction.

Further, the clamp section 51 has a stopper 55 which hits against one end face of the work W and a pair of clamps 56 for holding or releasing the work W. The opening and closing of the clamps 56 are driven by an air cylinder (not shown) built into the clamp section 51.

On the side opposite to the clamp section 51, a rotation receiving section 57 is arranged, and the rotation receiving section 57 is provided with a disk 59 which, rotatably disposed, rotates around a rotation axis 58 which is coaxial with the tool holding shaft 52 of the robot arm 50. Further, the rotation receiving section 57 is moved forward and backward along the rotation axis 58 by an actuator (air cylinder) 60, and the forward movement (movement toward the rotation axis 50a) of the rotation receiving section 57 causes the disk 59 to hit against the other end face of the set work W to clamp the work W while the backward movement causes the disk 59 to move away from the work W to release the work W from the clamping.

On the rotation receiving section 57 side, a stopper 61 which is moved upward and downward by an actuator (not shown) is provided, and the descent of the stopper 61 restricts the rotation of the disk 59, while the ascent of the stopper 61 enables the disk 59 to rotate.

Next, the operation of the embodiment shown in FIG. 7 will be described.

The work W clamped by the clamp section 51 of the robot arm 50 is carried to the laser welding section, keeps the axis of that work W in a horizontal state, and sets one end face of that work W in the M position shown in FIG. 7. After this positioning is done, the disk 59 is moved by the actuator 60 leftward in the drawing and hits against the other end of the work W in the P position in FIG. 7 to absorb any fluctuation of the work W in the axial direction. This causes the welding position, which is the fitting section 62 in the work W, to be correctly set in the position of the focal point F of the laser beam in the body part 8 of the laser processing device. Incidentally, after the work W is positioned in the direction of the rotation axis 50a as described above, it is preferable for the clamps 56 to be closed after being opened once to eliminate any deviation of the axis of the work W from the rotation axis 58.

After the work W is positioned as described above, the process progresses to the laser welding step.

After the work W is positioned, the head section 11 of the laser processing device is brought down by the elevating actuator 70 to its prescribed position and fixed there. At this time, the following device including the following roller 35 mentioned above positions the focal point F of the laser beam on the weld.

The stopper 61 of the rotation receiving section 57 is raised by an actuator (not shown) to release the rotation of the disk 59 from the restriction.

At the same time as the emission of the laser beam L, the work W is rotationally driven by the clamps 56 in the direction K, and the whole circumference of the fitting section 62 of the work W is laser-welded by the laser beam. Then the disk 59 is rotated by following the rotational force of the work W.

In the laser welding as in the above-described case, the shield gas G, the primary air A1 and the secondary air A2 are supplied to carry out welding, with air curtains similar to the foregoing being generated.

When the welding is completed as the work W has rotated 360 degrees plus the equivalent of welding lap, the head section 11 ascends and returns to its original position.

After that, the work W is moved leftward in FIG. 7 together with the clamps 56 by the robot arm 50, and the work W is released from the laser welding section to be carried to the next step.

After the release of the work W, the disk 59 of the rotation receiving section 57 is rotationally returned to the original indexing position by a weight (not shown), and the stopper 61 restricts the rotation of the disk 59.

Incidentally, in non-planar welding, since it is preferable from the viewpoint of welding posture for the weld to be always on the top face, it is desirable for the laser beam to hang down vertically and for the work W to be moved in welding a circular circumference as in this embodiment.

Further, since the rotation receiving sections 57, such as the ones described above, are usually arranged opposite each other on two sides, the work is brought in between them with a robot arm, that work is pinched by the two rotation receiving sections and the work is turned by the driving of those rotation receiving sections 57, each work is pinched and released by the robot arm twice each. Unlike this, in this embodiment not only can one of the rotation receiving sections 57 be dispensed with by providing the wrist of the robot arm with a function to clamp the work and a function to turn the work, but only each work can be pinched and released by the robot arm only once each, resulting in a substantial saving in the time taken to set and release the work, which means a significant advantage in a mass production process.

Another embodiment different from the foregoing will be described next.

Where the aforementioned following roller 35 is used in the foregoing embodiment, the accuracy of welding can be further enhanced by monitoring the frequency of revolutions, angular velocity and other factors of the following roller 35 in its idling state and utilizing the information thereby obtained for verifying the welding speed.

In welding the outer circumference of a work having a non-circular section while turning it around its axis, the welding speed of the outer circumference fluctuates even if the angular velocity of turning is constant. For this reason, even if the welding speed of the outer circumference is programmed and the angular velocity is variably set, monitoring the frequency of revolutions, angular velocity and other factors and utilizing the information thereby obtained for verifying the welding speed would make it possible to verify the actual welding speed on a real time basis, correct the angular velocity on that basis and thereby enhance the accuracy of welding.

More specifically, either the axial rotation of the following roller 35 may be directly detected with a rotation sensor (encoder or the like) or the following roller 35 may be indirectly measured with optical means (a photodiode, CCD or the like).

Such an embodiment can serve to further enhance the quality of welding.

Incidentally, while this embodiment represents an application of the invention to a welding device, applications of the invention are not limited to welding, but cover an extensive range of devices including those for laser processing, such as cutting or marking with a laser beam.

Therefore, in the foregoing cases of carrying out welding, the X direction is supposed to be the progressing direction of welding, but as the invention covers the aforementioned modes of processing other than welding, this X direction is the progressing direction of processing.

Figure 1:
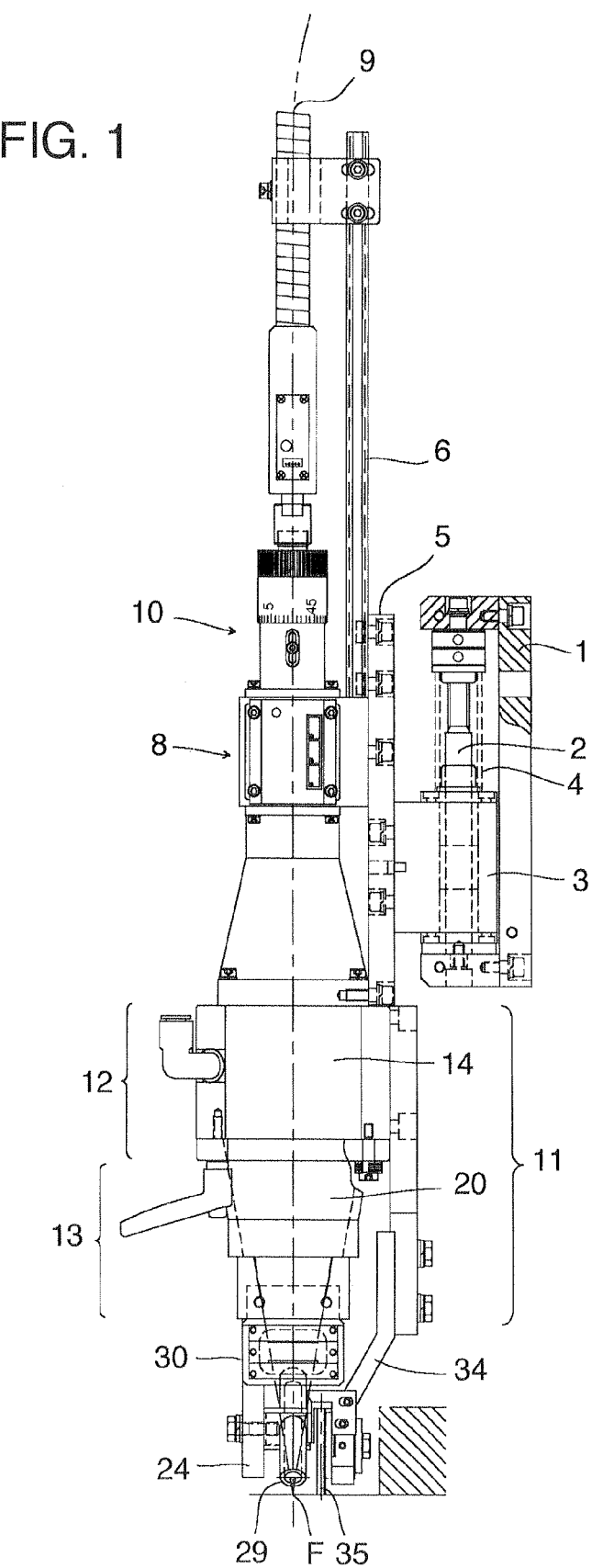
FIG. 1 shows an embodiment according to the present invention as seen in the progressing direction of processing.
Figure 2:
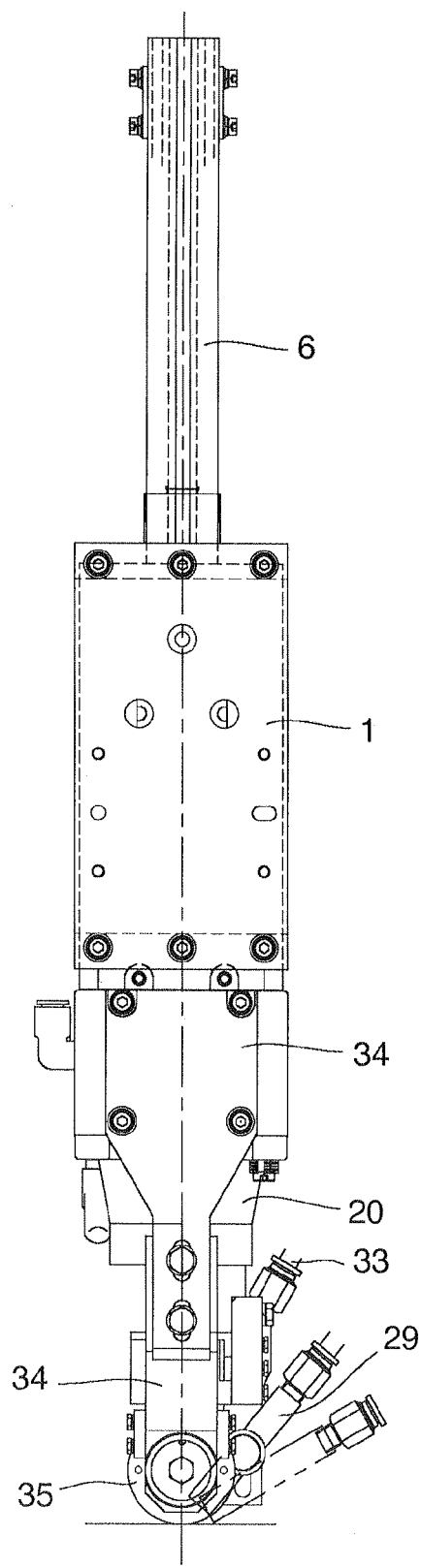
FIG. 2 shows a right side profile of FIG. 1.
Figure 3:
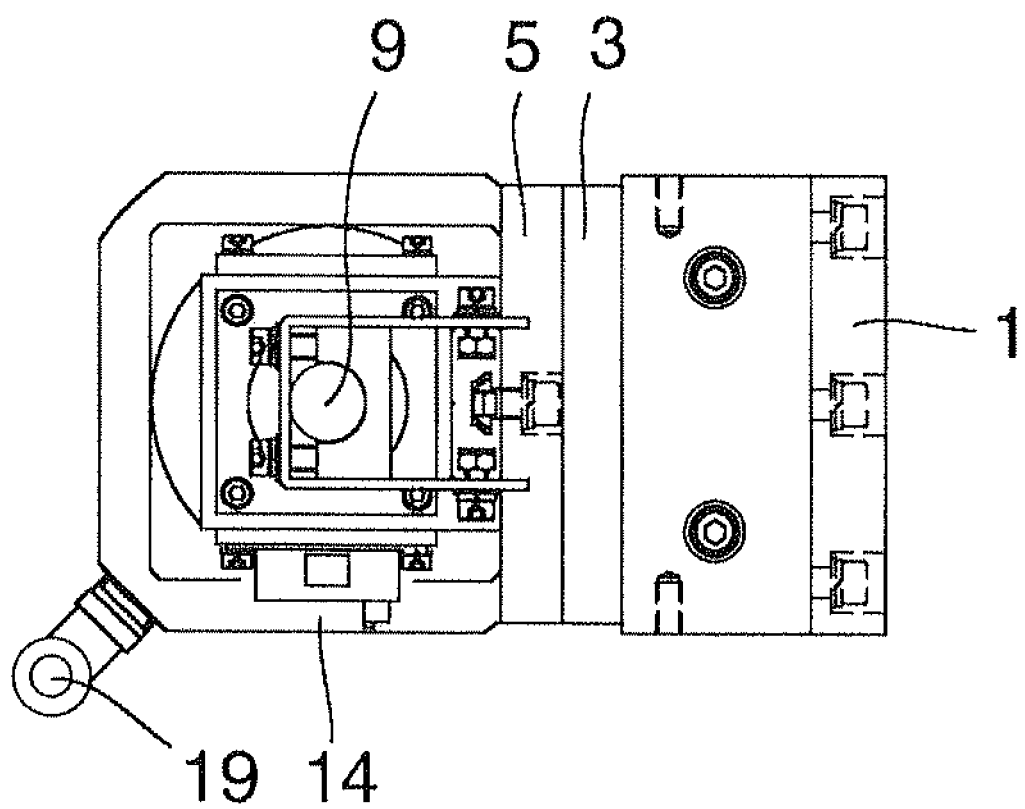
FIG. 3 shows a plan of the view of FIG. 1.
Figure 4:
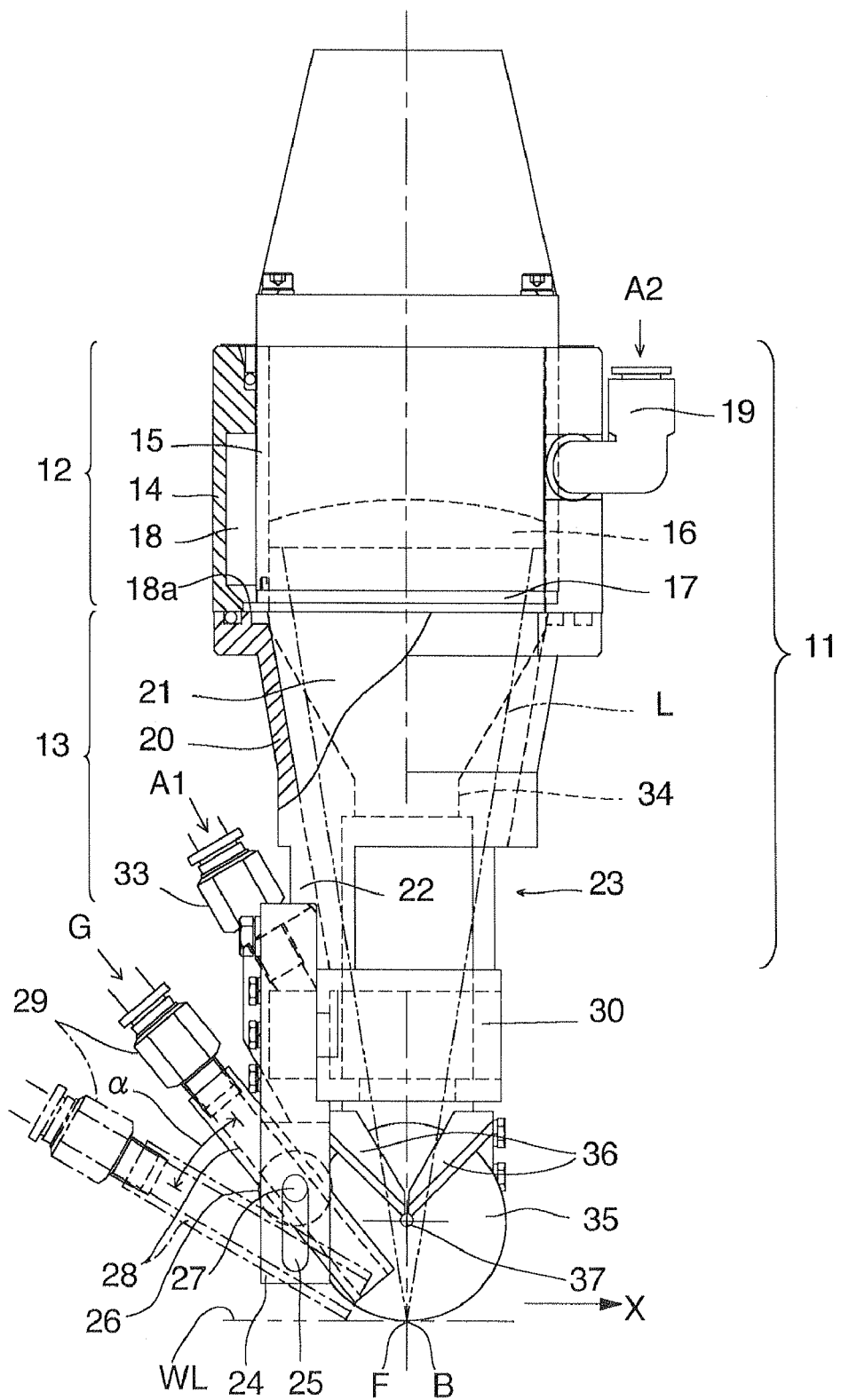
FIG. 4 shows a partially exploded view of the essential part in FIG. 1.
Figure 5:
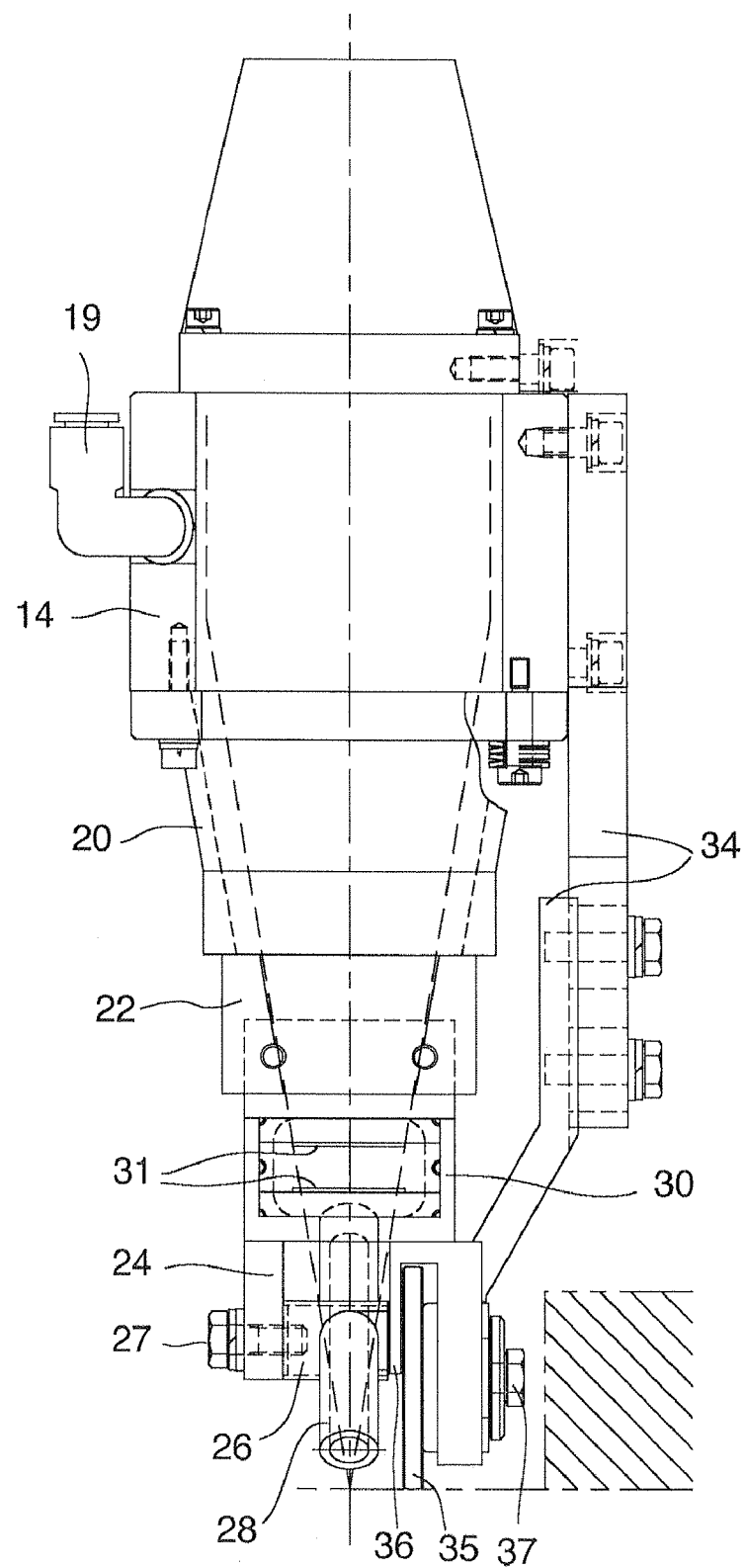
FIG. 5 shows a view as seen from the right side in FIG. 4.
Figure 6:
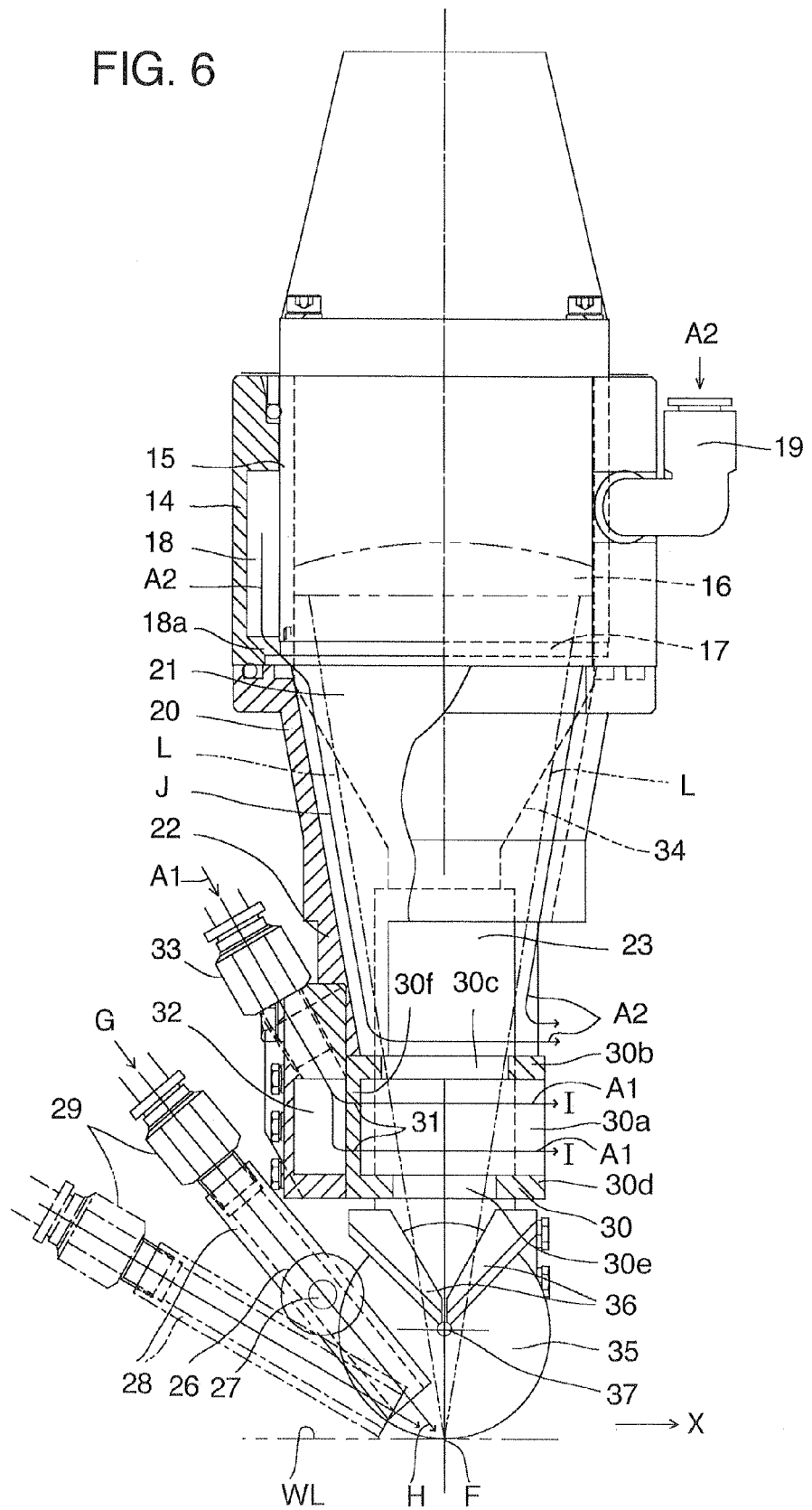
FIG. 6 shows a sectional view of the flows of air in FIG. 4.
Figure 7:
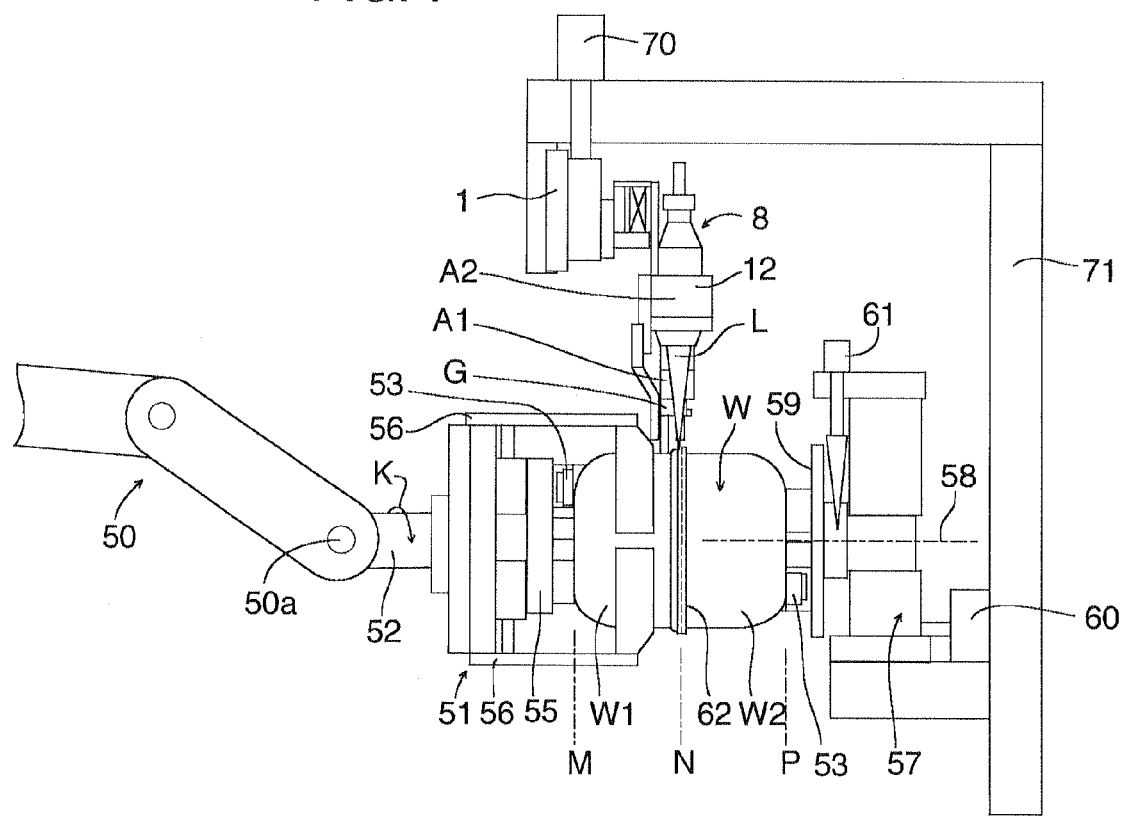
FIG. 7 shows an example of application of the invention to the welding and production of a vessel.
Figure 8:
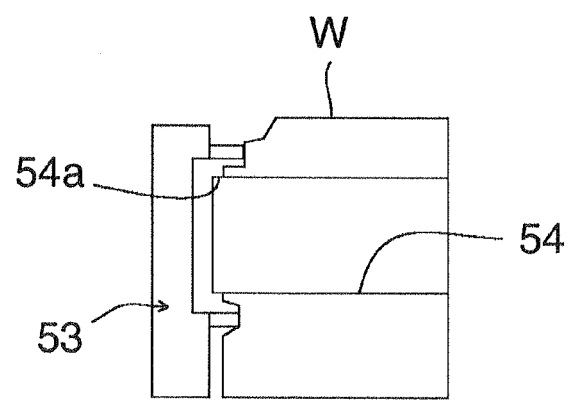
FIG. 8 illustrates the positioning of the direction of indexing the work in FIG. 7.

The invention claimed is:

1. A laser processing device comprising:
a head section wherein a laser beam condensed by a built-in condenser lens is radiated through a nozzle section provided on a lower part of said head section;
a shield gas delivery section which is disposed below said nozzle section and opens oriented in the progressing direction of processing in the vicinity of the focal point of the laser beam and jets out shield gas from the opening;
a primary air delivery section which is disposed apart from said head section and is oriented in the progressing direction of processing above said shield gas delivery section and forms a first air curtain by jetting out primary air in a substantially horizontal direction; and
a secondary air delivery section which is oriented in the focusing direction from the vicinity of said condenser lens and forms a second air curtain by jetting out secondary air.

2. The laser processing device as claimed in claim 1, wherein said primary air delivery section has slit-shaped outlets and a covering member which surrounds the primary air flow and permits the passage of a laser beam, and said secondary air delivery section is so configured as to jet out secondary air from around said condenser lens into the nozzle.

3. The laser processing device as claimed in claim 1, wherein the flow rate of said primary air is set greater than the flow rate of said secondary air when processing is to take place.

4. The laser processing device as claimed in claim 2, wherein the flow rate of said primary air is set greater than the flow rate of said secondary air when processing is to take place.

5. The laser processing device as claimed in claim 1, wherein a following roller rotatably pivots on a supporting arm extending from said head section, and the head section is displaced following the following roller.

6. The laser processing device as claimed in claim 2, wherein a following roller rotatably pivots on a supporting arm extending from said head section, and the head section is displaced following the following roller.

7. The laser processing device as claimed in claim 3, wherein a following roller rotatably pivots on a supporting arm extending from said head section, and the head section is displaced following the following roller.

8. The laser processing device as claimed in claim 4, wherein a following roller rotatably pivots on a supporting arm extending from said head section, and the head section is displaced following the following roller.

9. The laser processing device as claimed in claim 5, wherein wiper members are further provided to reject sticking matter on side faces of said following roller.

10. The laser processing device as claimed in claim 6, wherein wiper members are further provided to reject sticking matter on side faces of said following roller.

11. The laser processing device as claimed in claim 7, wherein wiper members are further provided to reject sticking matter on side faces of said following roller.

12. The laser processing device as claimed in claim 8, wherein wiper members are further provided to reject sticking matter on side faces of said following roller.

* * * * *